United States Patent [19]

Merrell

[11] 4,425,579

[45] Jan. 10, 1984

[54] CATV CONVERTER WITH KEYLOCK TO FAVORITE CHANNELS

[75] Inventor: Richard G. Merrell, Hebron, Ill.

[73] Assignee: Oak Industries Inc., Rancho Bernardo, Calif.

[21] Appl. No.: 266,166

[22] Filed: May 22, 1981

[51] Int. Cl.³ .............................................. H04N 1/00
[52] U.S. Cl. .................................... 358/86; 358/191.1; 455/3; 455/186
[58] Field of Search ............... 358/86, 191.1; 455/231, 455/186, 166, 3

[56] References Cited

U.S. PATENT DOCUMENTS

| | | | |
|---|---|---|---|
| 4,206,483 | 6/1980 | Nakamura | 455/231 |
| 4,214,274 | 7/1980 | Rzeszewski | 358/194.1 |
| 4,228,543 | 10/1980 | Jackson | 358/191.1 |
| 4,317,213 | 2/1982 | Lommzo | 455/231 |
| 4,325,081 | 4/1982 | Abe et al. | 455/231 |

OTHER PUBLICATIONS

K. Fwkui et al., "A Portable All-Band Radio Receiver Using Micro Computer Controlled PLL Synthesizer" IEEE Transactions on Computer Electronics, vol. CE-26, Aug. 1980.

Primary Examiner—Tommy P. Chin
Assistant Examiner—Edward L. Coles
Attorney, Agent, or Firm—Kinzer, Plyer, Dorn & McEachran

[57] ABSTRACT

A cable television converter includes an oscillator and mixer for conversion of a selected input television channel to the specific output frequency of the converter. There is a program selection device, and a memory responsive thereto whereby a subscriber may designate certain channels for conversion to the output frequency. The program selection device provides for restricting access to only those designated channels in the memory whereby a subscriber may control access of members of the household to only certain permitted channels.

3 Claims, 2 Drawing Figures

CATV CONVERTER WITH KEYLOCK TO FAVORITE CHANNELS

SUMMARY OF THE INVENTION

The present invention relates to cable television converters and particularly to such a converter in which the subscriber may restrict access to certain designated television channels.

A primary purpose of the invention is a cable television conversion means in which a subscriber may program, in a memory control unit, certain designated television channels, commonly termed favorite channels, and in which the subscriber may restrict access to only the designated channels.

Another purpose is a television converter of the type described in which the subscriber may restrict access to certain designated favorite channels and in which those favorite channels may be changed by subscriber manipulation of the keyboard or other data entry means.

Another purpose is a television converter for use on cable systems whereby the subscriber may set a keylock to restrict access by members of the viewing household to certain designated television channels.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention relates to cable television and more specifically to a cable television converter which is effective to convert any input channel selected by the subscriber to a predetermined output channel or a predetermined output frequency. More specifically, the invention is directed to a means whereby the subscriber may program certain channels into the converter memory and by operation of a portion of the channel selection device, for example the recall button, the specific channels in the memory will be sequentially shown to the subscriber so that he may make a selection. The invention is concerned with a restrictive device whereby the subscriber may restrict operation of the converter and thus the television set to certain designated channels which may be considered to be suitable for viewing by other members of the household. The specifically designated channels are those which are programmed into the subscriber's converter memory and these channels may be changed by the program selection device of the subscriber. Thus, the subscriber's favorite channels may be programmed into the converter memory for essentially automatic selection by the program selection device. These channels and only these channels will be available for subscriber viewing providing the subscriber operates the keylock or restrictive programming switch on his converter.

Figure 1:
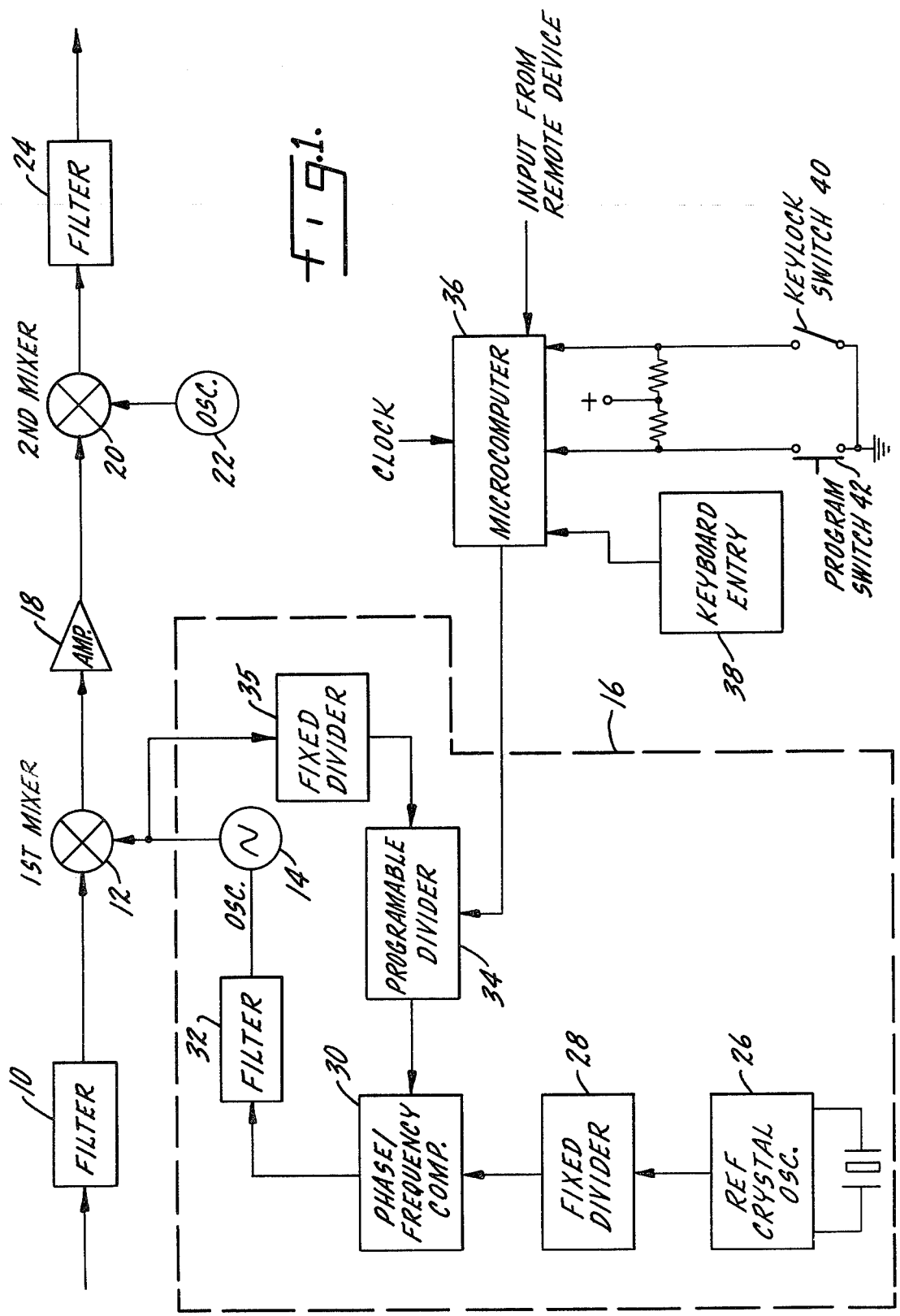
FIG. 1 is a schematic of a television converter of the type described.

In FIG. 1 a portion of a cable television converter is illustrated. There is an input filter 10 which will conventionally be connected to the cable and will receive the entire band of frequencies or available channels on the cable. Connected to filter 10 is a first mixer 12 which is also connected to an oscillator 14 forming a part of a phase lock loop 16 which controls tuning of the oscillator and thus the selected input frequency. An amplifier 18 is connected to the output of first mixer 12 with its output being connected to a second mixer 20. A fixed frequency oscillator 22 is also connected to the mixer 20 with the output from the mixer passing through a filter 24 and then to the VHF input of a television set. Typically, a selected channel from the band of frequencies available at the converter input will be converted to an output frequency which normally will be a television channel unused in the local area. Channel 3 or channel 4 outputs are conventional in converters of the type described. The invention should not be limited to double conversion type of converters, such as illustrated, as it has wider application.

Phase lock loop 16 which provides a controlled output frequency from oscillator 14 includes a reference frequency crystal oscillator 26 connected to a fixed divider 28. The output of the divider is connected to a phase/frequency comparator 30 whose output is connected to a filter 32. A programmable divider 34, having an input from a microcomputer 36, as described hereinafter, is connected in circuit with a fixed divider 35 between the output of oscillator 14 and an input of phase/frequency comparator 30. The operation of phase lock loop 16 is conventional with programmable divider 34 being used to control the output of oscillator 14 and to change the output of oscillator 14 in accordance with instructions from microcomputer 36. A more detailed description of the operation is illustrated in copending application Ser. No. 185,760, filed Sept. 10, 1980, and assigned to the assignee of the present application.

A keyboard entry device is indicated at 38 and may conveniently be a keyboard forming a part of the converter. In the alternative, the entry or selection of a program, may be from a remote location by one of many suitable remote program selection devices currently available on the market. The output from keyboard entry 38 is connected to microcomputer 36, whose program is illustrated by the flow chart of FIG. 2. Various types of devices are acceptable for microcomputer 36, with an S-2000 manufactured by AMI (American Microcircuits, Inc.) having been found to be satisfactory. There are several other inputs for microcomputer 36, one from a keylock switch 40 and another from a program switch 42, with one side of each of these switches being connected to ground and with the other sides being connected as inputs to the microcomputer as shown in FIG. 1. The keylock switch restricts access to those channels which are stored in the favorite channel memory as described in more detail hereinafter. The program switch is utilized by the subscriber when he wishes to change those channels designated in the microcomputer memory. The microcomputer will also have a clock input and an input from a remote selection device.

In operation, when a subscriber wishes to designate certain channels as his "favorite channels" and to place those channels in the microcomputer memory, the channel number is entered by the keyboard and that channel number will be entered in the computer memory providing program switch 42 is closed. The keyboard, whether it be remote or attached to the converter, will also include a recall switch and when the subscriber presses the recall switch, the computer will immediately provide an output to programmable divider 34 such that the next adjacent channel stored in the computer memory will be brought up on the television screen. Thus, programmable divider 34 will provide an output from oscillator 14 to mixer 12 such that a specifically designated channel will be converted to the output frequency. If the subscriber does not wish to view this particular channel, he again pushes the recall button and the next channel in the computer memory will be displayed. The process continues until the subscriber has cycled through all channels stored in the memory had has either rejected all such channels or has chosen a specific program to watch. Operation of the recall button will begin channel preview at the next available channel in the memory. In the alternative, channel preview may begin at the first channel in the memory. In either cases preview may continue as long as the subscriber continues the process.

When the keylock switch is closed, as will be described in connection with a more detailed explanation of the computer program, the only channels available for viewing by anyone in the subscriber's household are those channels stored in the computer favorite channel memory. Thus, the subscriber may restrict access to certain channels in his or her absence, with particular use of the keylock switch being for children's viewing when the subscriber is not at home.

Figure 2:
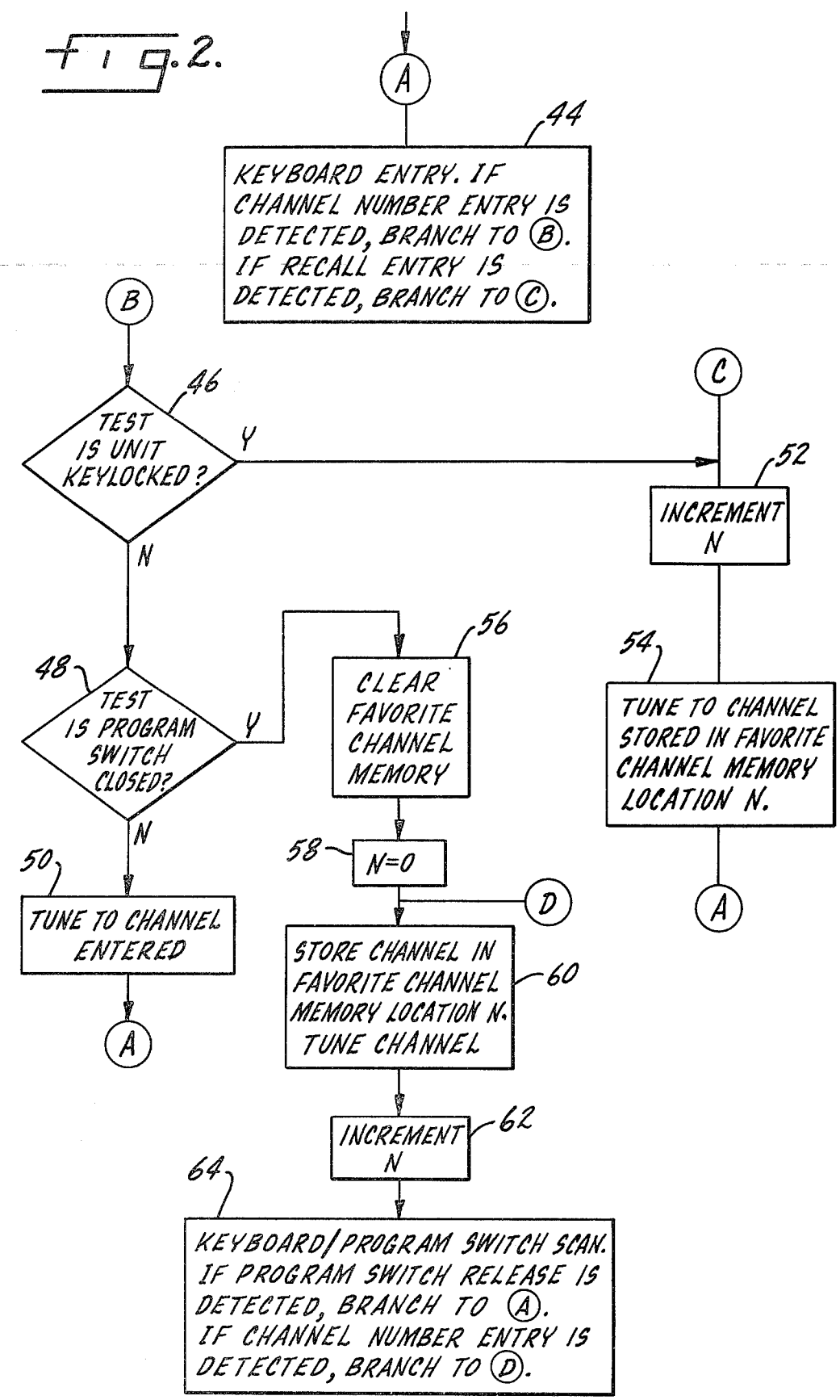
FIG. 2 is a flow chart for the microcomputer used in the schematic of FIG. 1.

FIG. 2 illustrates the program for microcomputer 36. The designation A is the entry to or the entry state of the computer program. Block 44 represents a keyboard entry from keyboard 38, or a remote device, into the computer. As indicated, if a specific channel number is entered, the computer program will follow pathway B, whereas if the recall button is operated as described above, pathway C is followed. Following first through pathway B, and assuming that a particular channel has been entered from the keyboard, the first question asked by the microcomputer program (block 46) is whether the keylock switch is closed. If the keylock switch is closed, then, as indicated, the computer program switches to pathway C. If the keylock switch is not closed, the next question is whether or not the program switch is closed (block 48). If the program switch is closed, indicating that the subscriber desires to change the channels in the memory, the computer program switches to the middle path illustrated in FIG. 2. If the program switch is not closed, then the computer will command (block 50) programmable divider 34 and oscillator 14 to provide a frequency to mixer 12 to tune the selected channel. The computer program will then return to its initial state which has been designated as A.

Pathway C is that path which normally is followed when the recall button is operated, whereby, the subscriber will sequentially view those specific channels stored in the computer memory. Also, if the unit is keylocked, then only those channels in the favorite channel memory may be viewed. As a first step, assuming either that the recall button has been operated or that a specific channel has been requested and the unit is keylocked, microcomputer 36 will provide an output such that the initial channel stored in the memory will be brought up for subscriber preview. This is indicated by increment block 52 and following block 54 which is an instruction to tune to the channel stored in the favorite channel memory at location N, N being the first location in the memory. This channel will remain on until such time as the subscriber again presses the recall button or another channel is entered and the unit is keylocked. Either entry will cause the computer to increment to the next channel stored in the favorite channel memory. This process will continue until the entire series of available channels has been shown to the subscriber for preview.

Looking at the middle path, and assuming that the unit is not keylocked and that the program switch is closed, when a subscriber keys in a specific channel, the first step (block 56) clears the favorite channel memory. The designated channel will then be entered in memory location N=0 designated by blocks 58 and 60. The computer will then instruct divider 34 to tune the designated channel. Each channel is entered individually and the program switch remains operated until all of the available slots in the computer memory have been filed with new channel designations (blocks 60,62,64). At that point, upon release of the program switch, the computer will return to state A with the result that the entire converter and its auxiliary keyboard equipment is now available for program selection. The keyboard switch must remain operated while all of the programs are entered into the memory. At such time as the program switch is released, then the computer memory is available for a keyboard entry, either for a specific program or for the operation of the recall switch.

In summary, the invention provides a means whereby a subscriber may designate certain channels as being "favorites" and these channels are stored in a memory whereby, by operation of a recall switch, these channels will be sequentially shown to the subscriber for preview and program selection. In addition, by operating the keylock switch, viewing is restricted to those channels stored in the favorite channel memory. Thus, the subscriber may close and lock the switch when leaving and will be assured that the remaining members of the household will only view those programs which are considered to be suitable. In this connection, the subscriber may change the designated channels in the memory at any time since what may be considered suitable for the subscriber may not be considered appropriate for other members of the family.

Whereas the preferred form of the invention has been shown and described herein, it should be realized that there may be many modifications, substitutions and alterations thereto.

The embodiments of the invention in which an exclusive property or privilege is claimed are defined as follows:

1. Cable TV converter means for selection of a specific input channel for conversion to an output frequency, including oscillator and mixer means for conversion of an input television channel to an output frequency, program selection means controlling said oscillator means, memory means responsive to said program selection means whereby a subscriber may designate certain channels for conversion to said output frequency, said program selection means and memory means permitting sequential preview of the designated channels by a subscriber, and means for restricting access of said program selection means to only those designated channels in said memory means including means for causing said memory and program selection means to convert only designated input channels to said output frequency upon selection of a non-designated channel.

2. The converter means of claim 1 further characterized by and including means for changing the designated channels stored in said memory means.

3. The converter means of claim 1 further characterized in that said oscillator and mixer means for conversion of an input channel to an output frequency includes first and second oscillators and first and second mixers, with said program selection means controlling said first oscillator which is connected to said first mixer.

* * * * *